Figure 5:
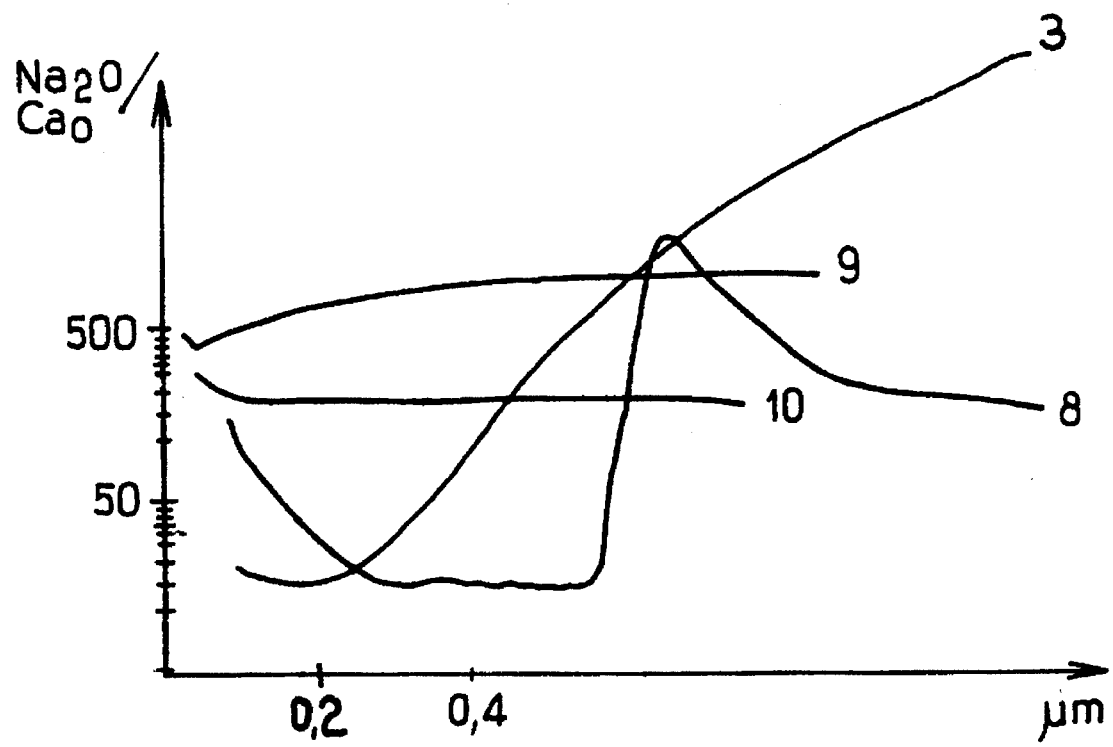

United States Patent [19]

Jousse et al.

[11] Patent Number: 5,648,172
[45] Date of Patent: Jul. 15, 1997

[54] DEALKALINIZATION OF SHEETS OF GLASS WITH LOW ALKALINES CONTENT

[75] Inventors: Didier Jousse, Saint-Leu La Foret; Pablo Vilato, Paris; Catherine Geoffroy, Vedene, all of France

[73] Assignee: Saint-Gobain Vitrage International, Courbevoie, France

[21] Appl. No.: 244,201

[22] PCT Filed: Sep. 29, 1993

[86] PCT No.: PCT/FR93/00950

§ 371 Date: Sep. 29, 1994

§ 102(e) Date: Sep. 29, 1994

[87] PCT Pub. No.: WO94/07807

PCT Pub. Date: Apr. 14, 1994

[30] Foreign Application Priority Data

Oct. 2, 1992 [FR] France ..................... 92 11661

[51] Int. Cl.$^6$ ..................................... B32B 9/00
[52] U.S. Cl. .................. 428/426; 428/325; 428/410; 428/427; 428/428; 428/432; 428/434; 428/472; 428/913; 65/30.13; 65/30.14; 65/111; 65/114
[58] Field of Search ................... 428/410, 428, 428/432, 434, 472, 701, 427, 426, 411.1, 913, 325, 312.6; 65/30.13, 30.14, 111, 114

[56] References Cited

U.S. PATENT DOCUMENTS

| 3,879,183 | 4/1975 | Carlson ............................. 65/30 |
| 3,959,000 | 5/1976 | Nakagawa et al. ................. 106/52 |
| 4,153,560 | 5/1979 | Dinter et al. ..................... 250/531 |
| 4,181,541 | 1/1980 | Le Francois ..................... 148/16.6 |
| 4,824,458 | 4/1989 | Ettori et al. ..................... 65/30.13 |
| 5,093,196 | 3/1992 | Hecq et al. ...................... 428/410 |
| 5,258,336 | 11/1993 | LaMastro ........................ 501/66 |

OTHER PUBLICATIONS

Database WPI Derwent Publications Ltd, London GB AN 86-141359.

*Primary Examiner*—Patrick Ryan
*Assistant Examiner*—Abraham Bahta
*Attorney, Agent, or Firm*—Oblon, Spivak, McClelland, Maier & Neustadt, P.C.

[57] ABSTRACT

This invention relates to a glass sheet having a low content of alkaline oxides and alkaline-earth oxides, in the composition of which the sum of the alkaline and alkaline-earth oxides is less than or equal to 15%, with a sodium oxide content less than or equal to 10%, the values being expressed in percentages by weight, at least one of the faces of which is constituted of a surface zone virtually devoid, notably, of alkaline ions.

15 Claims, 3 Drawing Sheets

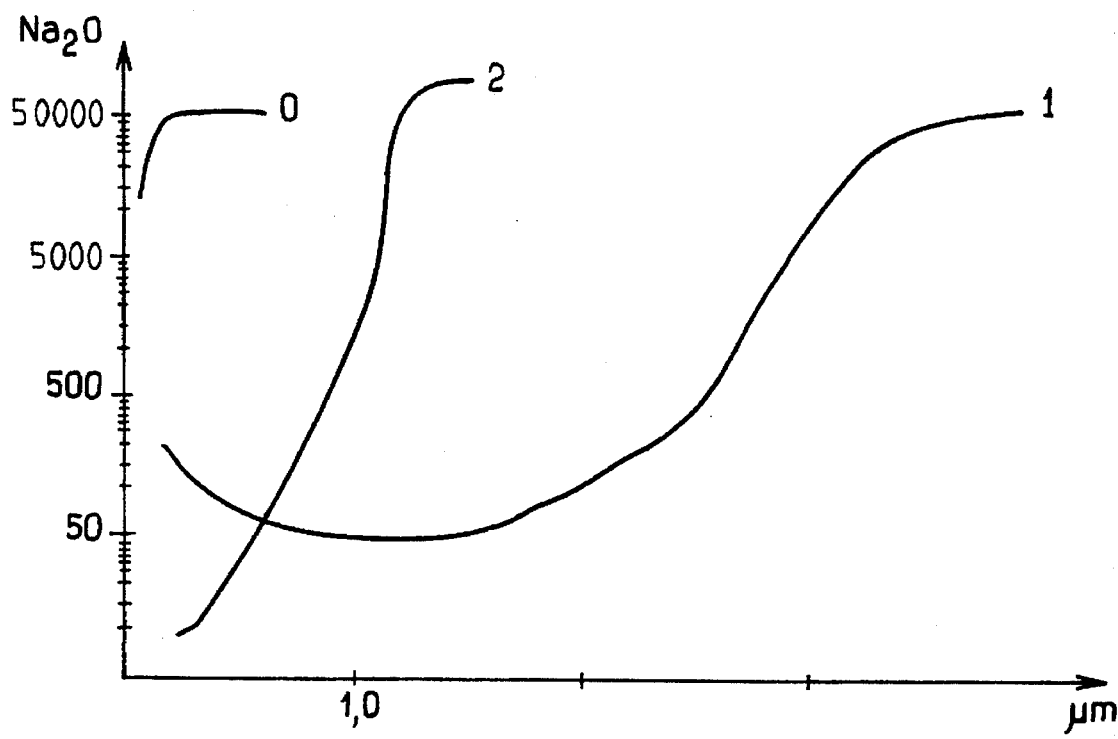
FIG_1
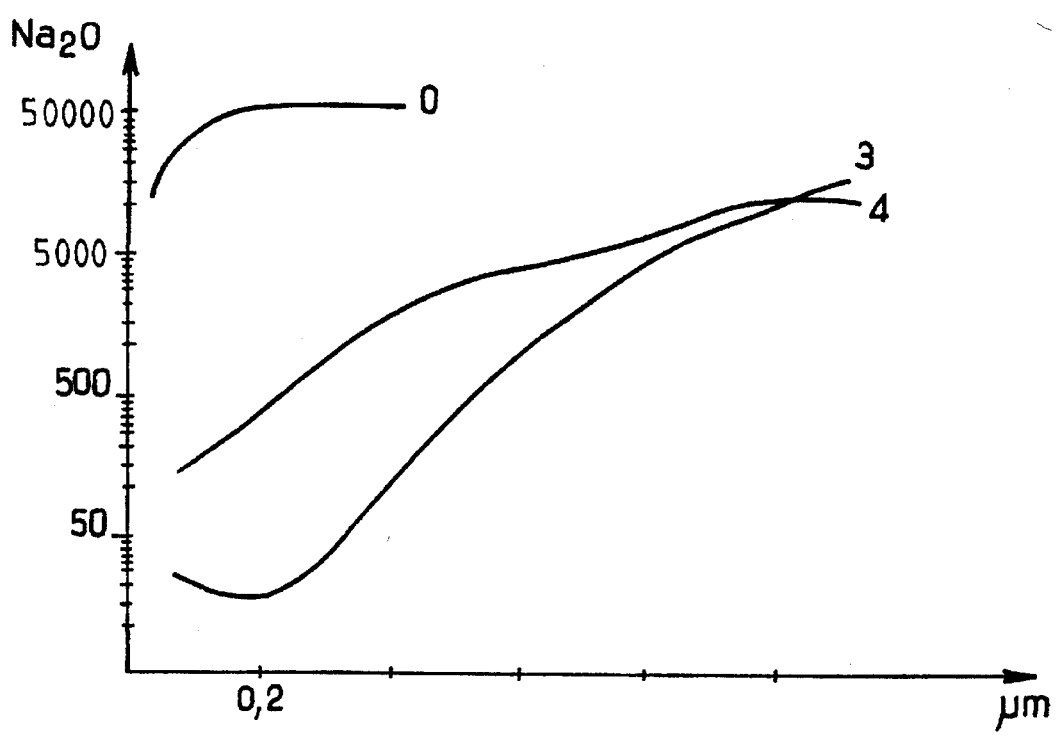
FIG_2

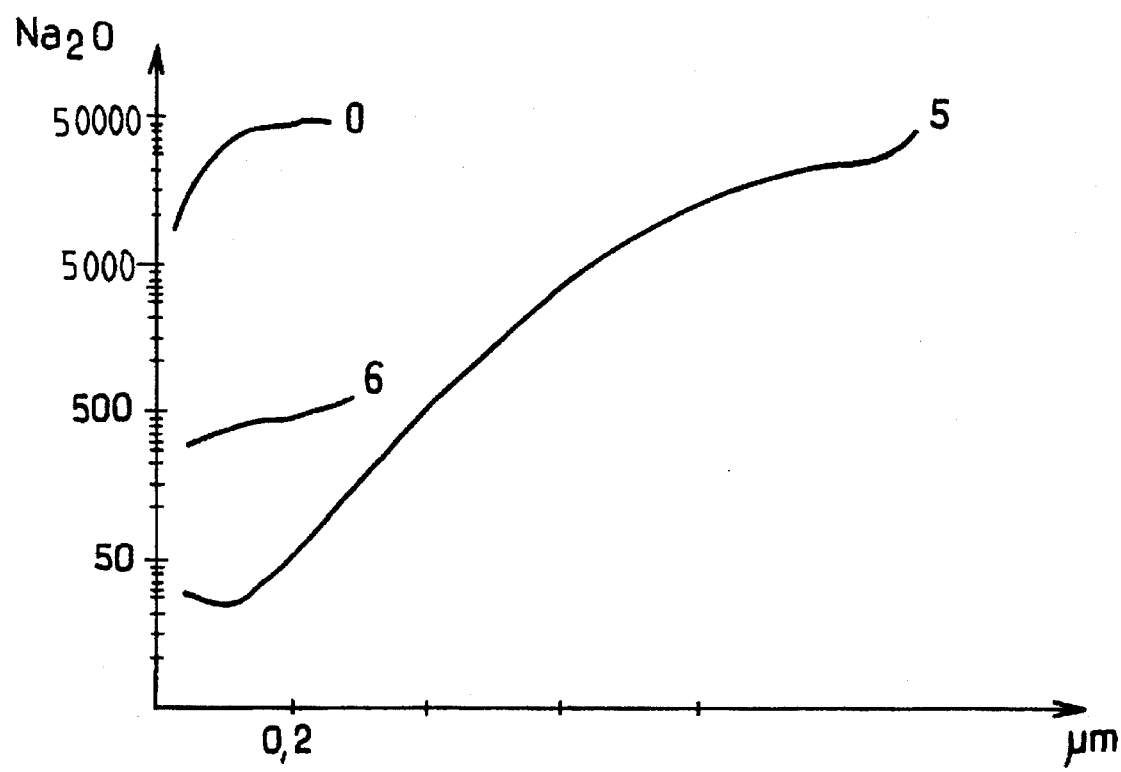
FIG_3
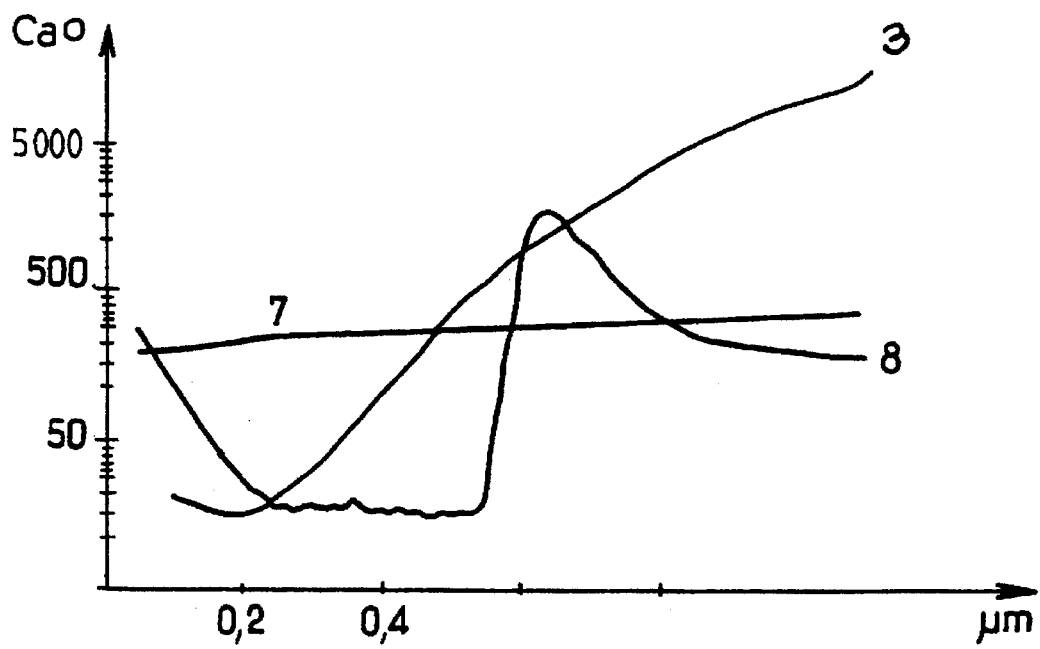
FIG_4

DEALKALINIZATION OF SHEETS OF GLASS WITH LOW ALKALINES CONTENT

This invention concerns glass products, notably sheets of glass with a low alkalines content, notably of the borosilicate type.

The composition of these glasses is such that the sum of the alkaline oxides and alkaline-earth oxides is less than or equal to 15%, with a sodium oxide content less than or equal to 10%. These glasses have special applications, for example, in the field of reinforcing fibres or electronics.

The characteristics, notably the thermal behaviour, of these glasses make them interesting for serving as supports in the electronics sector. In particular, these glasses are used for the production of screens. In these applications it is necessary to protect the supported materials against the possible contaminations that may result from the migration of alkaline ions and alkaline-earth ions originating from the support. This is the case, for example, when the materials deposited on the glass substrate are of the semiconductor type and the migration of the mobile ions appreciably alters their essential qualities.

For avoiding this type of difficulty, in the electronics field, it has been proposed to use sheets of glassy the composition of which is virtually devoid of alkaline and alkaline-earth oxides. These glass-making compositions may be such that the sum of the alkaline oxides and alkaline-earth oxides, mainly sodium oxide, is between 500 and 1,000 ppm. These glass sheets server notably, as substrates for flat screens. used in electronics.

It is known that the alkaline oxides have an important influence upon the properties of the vitrifiable mixture; in particular, they enable the viscosity at a given temperature to be reduced and the melting of the mixture to be improved. For these reasons a glass-making composition having a low alkaline content presents many difficulties in processing.

Another solution to the problem of the migration in glasses containing alkaline ions and alkaline-earth ions is to deposit a surface film based upon silica. This deposition may be carried out by pyrolysis, CVD, deposition under vacuum etc. This technique does, however, require an excellent preparation of the surface of the glass sheet intended to be covered with this film, in order to remove any pollution. This preparation is time-consuming and meticulous. Furthermore, even an excellent preparation does not enable the risks of delamination, which will be discussed later, to be averted.

An objective of the invention is to propose a glass which, simultaneously, offers a certain facility of processing and does not allow the alkaline ions and/or alkaline-earth ions forming part of its composition to migrate.

Another objective of the invention is to propose a glass sheet capable of replacing the glass sheets in which the composition is virtually devoid of alkaline ions, for particular applications such as electronics.

Another objective of the invention is to propose the means of production of this glass.

The present invention concerns a sheet of glass having a low content of alkaline ions and alkaline-earth ions, at least one of the faces of which has a surface zone virtually devoid of alkaline ions.

A glass sheet according to this invention is constituted of a glass, in the composition by weight of which the sum of the alkaline and alkaline-earth oxides is less than or equal to 15% with a sodium oxides content less than or equal to 10%.

The alkaline oxides content is, preferably, according to this invention less than or equal to 8%. Although the use of glasses having a low content of alkalines is satisfactory according to this invention, this content must not be too low so that the glass can be processed, as will be explained later. It is necessary, in fact, for the glasses in question to have a sufficient ionic conduction at the processing temperatures envisaged. To obtain a satisfactory conduction, the content of alkaline ions is, preferably, not less than 0.1%. The content of alkaline ions is, with advantage, between 2 and 8%.

In view of the low alkaline content and in order to maintain relatively low fusion temperatures, it is preferable for the glass to have a relatively high content of boron oxide. This content is ordinarily not less than 5% and, preferably, not less than 6%. The boron oxide content remains, generally, less than about 18%.

A preferred composition according to this invention is of the type containing the following principal constituents, the contents of which are expressed in percentages by weight:

| | |
|---|---|
| $SiO_2$ | 80–85% |
| $B_2O_3$ | 12–14% |
| $Al_2O_3$ | 1–3% |
| $Na_2O$ | 3–5% |

Other preferred compositions according to this invention are of the following type, the principal constituents being expressed in percentages by weight:

| | |
|---|---|
| $SiO_2$ | 70–75% |
| $B_2O_3$ | 9–10% |
| $Al_2O_3$ | 4–6% |
| $Na_2O$ | 5–6% |
| $K_2O$ | 0–1% |
| BaO | 3–4% |
| CaO | 0–1% |
| ZnO | 2–4% |
| or of the type: | |
| $SiO_2$ | 68–75% |
| $B_2O_3$ | 12–13% |
| $Al_2O_3$ | 5–7% |
| $Na_2O$ | 6–7% |
| $K_2O$ | 1–2% |
| BaO | 2–3% |
| CaO | 0–1% |

These glass sheets generally have a coefficient of thermal expansion between 30 and $50 \times 10^{-7}$ $K^{-1}$.

In certain applications, notably in the electronics field, it is advantageous for the glass sheet and the supported films to have coefficients of thermal expansion that are close together, in order to avoid any risk of delamination under the effect of temperature variations, such as those which are used, notably, at the time of forming these films. In the case of the production of a high-resolution screen (of the type polycrystalline silicon thin film transistor liquid crystal display) the coefficient of thermal expansion of the supported film is of the order of $40 \times 10^{-7}$ $K^{-1}$, which is compatible with a substrate having a coefficient of thermal expansion as indicated above.

The surface zone of the sheet according to this invention does not contain more alkaline ions than the glasses known as "alkaline-free", which have been discussed above and this content may even be substantially lower. Thus the alkaline ions content at the surface of the glass is, preferably, less than 500 ppm or can even reach a value less than or equal to 50 ppm.

These contents are those in a surface zone which, ordinarily, does not exceed 1 micron in depth and, most commonly, is less than 0.5 micron.

In the intended uses, notably as electronic screens, a depth of this order of magnitude is very largely adequate for preventing the migration of the ions into the semiconducting films or into the active films supported by the glass sheet. Provided that this layer is highly uniform, depths less than 0.5 micron are also very satisfactory. The sheets obtained according to this invention have a surface zone, within which the sodium oxide content is less than 500 ppm, and indeed less than 50 ppm over at least 0.2 µm.

A significant test for quantifying the resistance of the substrate to the migration of these ions is the test known as "rerelease" test. This consists of measuring the sodium oxide content released by the substrate after a dwell time of 24 hours in demineralized water at 96° C.

The glass sheet according to this invention releases a proportion of its sodium constituent less than 0.01 µg/cm$^2$.

For superficially deionizing glasses, it is possible to operate by chemical method. The glass article is subjected to a solution or an atmosphere that reacts with the alkaline ions of the glass. To facilitate the reaction, the operation is carried out at a temperature higher than ambient temperature. This type of treatment usually requires a contact time that is incompatible with the continuous treatment of glass sheets. For this reason, this type of treatment is used mainly in the case of batches of articles, for example bottles or flasks.

Another technique is the deionization under the effect of an electric field applied between two electrodes. The application of the field mobilizes the ions which are most easy to displace, in particular the alkalines, towards the cathode. Solid or gaseous electrodes may be used.

Direct contact between the electrode and a glass sheet does not favour a uniform treatment. The use of electrodes at a short distance from the glass sheet and the formation of a "corona discharge", also known by the term "plasma", on the contrary make possible a high uniformity and stability of the ion flux over the entirety of the sheet.

This technique has hitherto been envisaged for the treatment of glass of the silico-sodo-calcic type, that is to say glass containing a high content of alkaline and alkaline-earth oxides, exceeding 15% and, notably, a sodium oxide content greater titan 12%. The production of a corona discharge on a glass sheet implies a certain conductivity of this sheet in the operating conditions chosen. At ambient temperature, glasses are not good enough conductors to allow the establishment of such a discharge. In the casa of the sodo-calcic glasses, the migration of the most mobile ions and, notably, of the alkaline and alkaline-earth ions, becomes sufficient at temperatures higher than approximately 450° C.

In these conditions, a substantial reduction of the content of these ions in the composition of the glasses treated inevitably ran counter to the use of a deionization technique. In fact, the possibility of compensating the low content of mobile ions by an increased mobility of these ions appeared difficult to achieve. A raising of the treatment temperature came up against the question of possible softening of the sheet. The increase of the applied voltage raised other difficulties. For example, the increase in the voltage is limited by the formation of electric arcs, which do not allow a uniform treatment.

Contrary to what might have been expected, the inventors have shown that a glass sheet having a low content of alkaline ions and alkaline-earth ions, as defined above, is capable of being deionized at the surface by the corona discharge process.

In spite of their low proportion, the ions which are mobile under the effect of a field of intensity comparable to that used previously with sodo-calcic glasses are capable of diffusing within the body of the glass.

For the production of the glass sheets according to this invention, the inventors have found the conditions that are most suitable for the desired result in the use of the technique of deionization by plasma.

According to this invention, a d.c. voltage is preferably applied. This voltage is a function of various factors. including the amount of deionization desired, and also the treatment temperature, the distance between the electrodes and the sheet, the speed of travel etc.

For obtaining a sufficient treatment in industrially practicable periods of time, it is desirable to operate at a sufficiently high voltage. This voltage is limited to that for which the risk of the development of electric arcs would be too great. In the opposite direction, it is necessary, in order to initiate the formation of the discharge, to apply a voltage which is not too low.

In the preferred conditions, notably, of temperature, distance from the electrodes, speeds of travel and so on, which are examined below, advantageous mean voltage values between the electrodes lie, for example, between 650 and 1,300 V and, preferably, between 900 and 1,100 V.

In view of the voltage regulation carried out as indicated above, the intensity of the current discharge becomes established as a function of the electrical conduction of the assembly situated between the electrodes. It is obvious that the temperature of the treated sheet is among the most important factors. In view of the low content of mobile ions and of the low conductivity property resulting therefrom, it is preferably to operate at a temperature of at least 450° C. and, preferably, higher than 500° C. The temperature of the glass is not, ordinarily, higher than 650° C. and, preferably, is not higher than 600° C., in order to avoid a possible softening of the glass.

The inventors have shown that, depending upon the applied voltage and the speed of treatment, the composition of the deionized surface varies substantially. As an indication, a prolonged treatment and a large quantity of electricity passing through the specimen corresponding, for example, to a succession of deionizations by repeated passage of the glass sheet through the electric field, leads to a relatively deep deionized zone. In comparison, surprisingly, a treatment corresponding to a lesser quantity of electricity passing through the specimen in a shorter time, for example by an increase of the applied voltage and, simultaneously, a reduction in the number of passes. can lead to a deionization which is indeed less deep but for which the residual contents of mobile ions on the treated surface are lower than previously. This result is particularly favourable for a later electronic application, notably as substrates for flat screens. The number of passes through the electric field, established in the voltage conditions indicated above, is then preferably between 1 and 5.

Experience has shown that compromises are necessary between the speed of passage and the applied voltage, depending upon the result desired. It appears, in particular, that an increase above approximately 1,200 V in the temperature conditions specified above does not allow a speed leading to an optimum treatment to be used. In these conditions, as we shall see from the examples of operation, the speed of passage which will avoid the risk of arc formation becomes too high for an intense treatment. This speed is, preferably, between 1 and 3 m/min.

In the light of the operating conditions developed above, the quantity of electricity passing through the specimen during the treatment is advantageously greater than 20 mC/cm$^2$ for obtaining a good deionization according to the invention. It preferably lies between 20 and 30 mC/cm$^2$.

Details of the tests and advantages achieved according to this invention are given in the remainder of this description, in which:

FIG. 1 is a graph showing measurements of the sodium oxide content in the surface zone of the specimen according to the voltage applied and the number of passages of the specimen through the electric field, FIG. 2 is a graph of measurements of the sodium oxide content within the surface zone of the specimen according to the applied voltage, the number of passes undergone by the specimen being fixed at 2, FIG. 3 is a graph of measurements of the sodium oxide content in the surface zone according to the applied voltage, the number of passes undergone by the specimen fixed at 1, FIG. 4 is a graph of measurements of the calcium oxide content in the surface zone before and after deionization by corona discharge according to this invention, FIG. 5 represents the structure of the deionized surface zone of a glass according to this invention and of an alkaline-free glass.

A comparative example illustrates the advantages of the invention compared with a glass of the type known as "alkaline-free".

All these graphs have been obtained by the analysis of the mass spectrum of the ions sputtered by ion bombardment (technique known by the abbreviation SIMS).

Three series of tests were performed, the operating conditions being as follows:

dimension of the glass sheet: 300×300 mm, temperature of the sheet: 550° C., nature of the plasma-forming gas: helium or argon.

The electrodes are situated on either side of the glass sheet and at a small distance from the sheet of the order of a few millimeters. The corona discharge is regulated in voltage.

The first series shows the influence of the treatment by corona discharge and of the operating conditions on the proportion of sodium constituent present in the surface zone of a glass sheet tested, compared with a reference specimen no. 0. This specimen has undergone a thermal cycle—30 min. at 550° C.—in order to place it in the same conditions as those of the specimens treated by corona discharge.

Specimen no. 1 has undergone fifteen passes through the electric field under a voltage across the electrodes of between 950 and 1,070 V; specimen no. 2 has undergone four passes through an electric field, under a voltage across the electrodes of from 650 to 740 V.

Repeated passes of the specimen through an electric field enable both the treatment time of the specimen and also the current intensity passing through the specimen to be increased.

As an indication, the quantity of charges measured relative to specimen no. 1 is 66 mC/cm$^2$ and is 25 mC/cm$^2$ for specimen no. 2.

In this series of tests, in addition to the voltage it is important to point out the simultaneous modification in the speed of travel. This is made necessary by the fact that, since the conduction of the glass varies appreciably with the voltage applied, it is appropriate to increase the speed of passage of the glass sheet undergoing test in order to prevent the formation of electric arcs. This speed is 1 m/min. for a voltage across electrodes of 650 to 742 V and is 3 m/min. for a voltage across electrodes of 950 to 1,070 V.

The composition of the glass used is as follows, the proportions of the various elements being expressed in percentages by weight:

| | |
|---|---|
| $SiO_2$ | 81% |
| $B_2O_3$ | 13% |
| $Na_2O$ | 4% |
| $Al_2O_3$ | 2% |

FIG. 1 illustrates these results. The ordinate axis represents the content of the Na component to a logarithmic scale, expressed in ppm, and the abscissa axis represents the depth of the specimen tested, expressed in microns. Curves 0, 1 and 2 correspond respectively to specimens 0, 1 and 2. The reference specimen no. 0 possesses a relatively high content of sodium oxide (40,000 ppm) by comparison with curves 1 and 2, which shows the effectiveness of the corona discharge treatment according to this invention on glasses having a low alkalines content.

Curves 1 and 2 exhibit different profiles.

Curve 2 shows a relatively abrupt and intense variation in the sodium component content within the surface zone, compared with curve 1.

The results are grouped in the attached table. These results are satisfactory. The parameters investigated relating to the structure of the deionized zone are the depths of the deionized zone for a sodium oxide content less than 500 ppm and less than 50 ppm. These contents have been chosen in comparison with the glasses known as alkaline-free, in which the sodium oxide content is between 500 and 1,000 ppm. The values obtained in the three series of tests are summarized in the attached table.

Surprisingly a zone is found (FIG. 1) in which the deionization of the sodium component is less thorough but relatively deep (2 μm) for prolonged treatment conditions (curve 1).

A more intense deionization is obtained (curve 2) for a treatment which overall is less thorough, taking account simultaneously of the different parameters: voltage, speed and number of passes.

A compromise should therefore be found between these parameters.

In the light of these first tests, a second series of tests was carried out at higher applied voltages between the electrodes of the order of 1,075, 1,275 V, each specimen tested undergoing only two passes through the electric field. The speeds of travel are, respectively, 1.75 m/min. and 3 m/min. The other operating conditions are identical to those described above.

For a voltage of 1,075 V, the quantity of charges measured is 26 mC/cm$^2$; for a voltage of 1,275 V, it is 21 mC/cm$^2$.

Surprisingly, a smaller quantity of charges passing through the specimen is obtained when the voltage is higher.

FIG. 2 illustrates the results obtained. Curve 0 represents a reference specimen which has undergone the same thermal cycle as that described in the first series of tests, for identical reasons. Curves 3 and 4 (corresponding respectively to an applied voltage between the electrodes of 1,075 and 1,275 V) exhibit different profiles, and in particular curve 3 demonstrates a higher deionization than that of curve 4. The sodium oxide content is higher within the deionized layer for a higher voltage (1,275 V) compared with a less high voltage (1,075 V).

Furthermore, the depth of the deionized layer for the higher voltage (1,275 V) is not significant.

The form of this curve can be explained, according to the inventors, by the increase in the speed of passage simultaneously with the increase in the voltage. This increase was found necessary in order to prevent the formation of any electric arcs; it therefore appears too high for an intense treatment.

The results are summarized in the attached table. These results are satisfactory, a sodium component content less than 500 ppm, and indeed less than 50 ppm for specimen no. 3, being obtained.

FIG. 3, illustrating a third series of tests, confirms the conclusions reached by observation of FIGS. 1 and 2. Curves 5 and 6 relate to specimens 5 and 6, corresponding to applied voltages across the electrodes of 990 and 1,040 V respectively.

This series of tests was performed in the same conditions as before, except for the number of passages of each specimen through the electric field (in this case it is one). The quantities of charges measured are, respectively, 21 mC/cm$^2$ and 16 mC/cm$^2$.

The results are practically identical to those obtained in the second series of tests. A slight decrease will be noted in the depth of the deionized layer with the change from two passes to one pass, which is in agreement with the conclusions previously reached, that is to say that an increase in the number of passes of the specimen through the electric field increases overall the thickness of the deionized zone.

In the light of these experiments, a very clear influence of the operating conditions upon the structure of the deionized zone can be seen. These conditions can be adapted according to the envisaged application, while still allowing for the physical constraints resulting from the operating mode adopted such as, for example, the number of passes to be performed for each specimen and the speed of passage of the glass sheet. These two parameters particularly have an effect upon the treatment time of each specimen.

For an application in electronics as an electronic support, a good compromise is a voltage across the electrodes of the order of 1,000 V, a speed of passage of approximately 1.75 m/min. and two passes of a specimen through the electric field. The quantity of charges then passing during the treatment is of the order of 25 mC/cm$^2$.

FIG. 4 shows the deionization obtained according to this invention, not only of alkaline oxides but also of alkaline-earth oxides.

Curves 7 and 8 correspond, respectively, to the calcium oxide content of a reference specimen which has undergone a thermal cycle—30 min. at 550° C.—and of a specimen obtained in the same operating conditions as that of curve 3 of FIG. 2 (average voltage across the electrodes 1,075 V; speed of travel approximately 1.75 m/min.; two passes, glass temperature 580° C.).

Curve 3, corresponding to the sodium oxide content of this same specimen, is repeated for purposes of comparison.

The results are summarized below:

| Depth of deionized zone corresponding to a content of | Curve 7 | Curve 8 |
|---|---|---|
| Calcium oxide less than 500 ppm (in μm) | >1 | 0.62 |
| Calcium oxide less than 50 ppm (in μm) | — | 0.40 |

An effective deionization with respect to calcium oxide is observed according to the process of this invention.

By comparing curves 3 and 8 relating to sodium oxide and calcium oxide respectively, it will be seen that calcium oxide, although less mobile than sodium oxide, has diffused equally well, and indeed better, within the body of the glass under the effect of the corona discharge.

EXAMPLE 1

The following example illustrates the advantages of this invention with respect to a glass known as "alkaline-free".

Three glass sheets are subjected to the so-called "rerelease" test for sodium. This test consists of immersing each of the glass sheets in a demineralized water at 96° C., for which the content of the sodium component is known. After 24 hours, the water is collected and the sodium content is measured. From the difference, the content of sodium released by each of the glass sheets is obtained.

A sheet A is formed of a known glass, termed "alkaline-free", the measured chemical composition of which is as follows, the contents being expressed in percentages by weight:

| | |
|---|---|
| SiO$_2$ | 46.7% |
| B$_2$O$_3$ | 14.8% |
| Al$_2$O$_3$ | 12.7% |
| Na$_2$O | 0.1% |
| BaO | 24.9% |
| As$_2$O$_3$ | 0.3% |
| Impurities | 0.5% |

The other two sheets are produced according to this invention under the operating conditions below.

The speed of travel is 1.75 m/min.

The values of the average voltage between the electrodes and the number of passages of sheet B are respectively 1,050 V (between 900 and 1,070) and 19 passes.

The values of the mean voltage between the electrodes and the number of passes for sheet 3, in accordance with curve 3 of FIG. 2, are respectively 1,075 V (voltage between 1,030 and 1,120 V) and 2 passes.

The upper operating conditions are identical to those described in relation to the Figures.

The sodium component contents measured are as follows:

| | |
|---|---|
| Sheet A (glass known as alkaline-free): | 0.015 μg/cm$^2$ |
| Sheet B (according to the invention): | 0.01 μg/cm$^2$ |
| Sheet 3 (according to the invention): | 0.008 μg/cm$^2$ |

According to the invention, the deionized layer constitutes a better barrier against the migration of the sodium constituent than that obtained with a glass known as alkaline-free.

FIG. 5 illustrates the structure of the deionized zone of sheet 3 and of the alkaline-free glass.

Curves 3 and 8 correspond to the sodium oxide and calcium oxide contents respectively of sheet 3.

Curves 9 and 10 correspond to the sodium oxide and calcium oxide contents respectively of the glass known as alkaline-free.

The results are summarized below:

| Depth (in μm) of the deionized zone corresponding to a content of | Glass known as alkaline-free | Sheet 3 |
|---|---|---|
| Calcium oxide less than 500 ppm | >1 | 0.62 |
| Calcium oxide less than 50 ppm | — | 0.40 |
| Sodium oxide less than 500 ppm | 0.007 | 0.56 |
| Sodium oxide less than 50 ppm | — | 0.36 |

The surface zones of the sheets produced according to this invention exhibit contents of sodium oxide and calcium oxide less than those present in the glass termed alkaline-free, commonly used in the electronics field. The glass sheets according to this invention can serve as substrates for the production of flat screens in the electronics field, notably flat screens of the type LCD (liquid crystal display) or of the electroluminescent type, or even flat screens having an active matrix termed "active matrix liquid crystal display".

EXAMPLE 2

This example illustrates the difficulty of deionizing a glass having a low alkalines content.

A glass sheet, made of a glass termed alkaline-free in which the composition is identical to the composition described in Example 1, is subjected to a corona discharge according to this invention.

In order to obtain an intense treatment, the operating conditions are as follows:

| | |
|---|---|
| applied voltage between electrodes: | 2,600 V |
| charges quantity measured: | 0.5 mC/cm² |
| speed of travel: | 2 m/min. |
| number of passes: | 36 |

A surface zone is obtained comprising a sodium oxide content of 300 ppm to a depth of 0.5 μm.

In spite of the particularly severe operating conditions, a deionization is obtained which is relatively poor compared with the values obtained according to this invention, which can reach a content less than 50 ppm to at least 0.2 μm.

This example illustrates the difficulty of deionizing glasses that are virtually devoid of alkalines, the quantity of charges passing through being almost non-existent: the initial alkaline content in the glass is an important parameter for carrying out the process according to the invention.

TABLE

| | Specimen | | |
|---|---|---|---|
| | 1 | 2 | 3 |
| Operating conditions | | | |
| Voltage applied between electrodes (V) | 950–1,070 | 650–740 | 1,030–1,120 |
| Mean voltage applied between the electrodes (V) | 1,050 | 695 | 1,075 |
| Number of passages through the electric field | 15 | 4 | 2 |
| Speed of travel (m/min.) | 3 | 1 | 1.75 |
| Quantity of charges measured (mC/cm²) | 66 | 25 | 26 |
| Structure of deionized zone | | | |
| Depth of deionized zone in which the sodium oxide content is less than 500 ppm (μm) | 2.6 | 1.0 | 0.56 |
| Depth of deionized zone in which the sodium oxide content is less than 50 ppm (μm) | 0 | 0.6 | 0.36 |

| | Specimen | | |
|---|---|---|---|
| | 4 | 5 | 6 |
| Operating conditions | | | |
| Voltage applied between electrodes (V) | 1,230–1,320 | 990 | 1,040 |
| Mean voltage applied between the electrodes (V) | 1,275 | 990 | 1,040 |
| Number of passages through the electric field | 2 | 1 | 1 |
| Speed of travel (m/min.) | 3 | 1.75 | 3 |
| Quantity of charges measured (mC/cm²) | 21 | 21 | 16 |
| Structure of deionized zone | | | |
| Depth of deionized zone in which the sodium oxide content is less than 500 ppm (μm) | 0.45 | 0.43 | 0.30 |
| Depth of deionized zone in which the sodium oxide content is less than 50 ppm (μm) | 0.06 | 0.22 | — |

We claim:

1. A low alkaline oxide and alkaline-earth oxide content borosilicate glass sheet comprising:

at least one face comprising a surface zone within which the alkaline ion content is less than or equal to 500 ppm to a depth of at least 0.2 μm; and a composition comprising:
sodium oxide;
alkaline oxides other than sodium oxide;
alkaline-earth oxides; and
boron oxide;

wherein the sum of said sodium oxide, said alkaline oxides other than sodium oxide, and said alkaline-earth oxides is less than or equal to 15% by weight of the total glass sheet;

wherein the amount of said sodium oxide is less than or equal to 10% by weight of the total glass sheet;

wherein said boron oxide content is not less than 5% by weight of the total glass sheet; and wherein said glass sheet has a coefficient of thermal expansion of between $30–50\times10^7$ $K^{-1}$.

2. The glass sheet of claim 1, wherein said alkaline oxide content of said composition is 2 to 6% by weight of the total glass sheet.

3. The glass sheet of claim 1, wherein said boron oxide content is 5 to 18% by weight of the total glass sheet.

4. The glass sheet of claim 1, wherein said boron oxide content is 6 to 15% by weight of the total glass sheet.

5. The glass sheet of claim 1, wherein said composition comprises:

| | |
|---|---|
| $SiO_2$ | 80–85% |
| $B_2O_3$ | 12–14% |
| $Al_2O_3$ | 1–3% |
| $Na_2O$ | 3–5% | wherein the percentages are expressed as percentages by weight of the total glass sheet.

6. The glass sheet of claim 1, wherein said composition comprises:

| | |
|---|---|
| $SiO_2$ | 70–75% |
| $B_2O_3$ | 9–10% |
| $Al_2O_3$ | 4–6% |
| $Na_2O$ | 5–6% |
| $K_2O$ | 0–1% |
| BaO | 3–4% |
| CaO | 0–1% |
| ZnO | 2–4% | wherein the percentages are expressed as percentages by weight of the total glass sheet.

7. The glass sheet of claim 1, wherein said composition comprises:

| | |
|---|---|
| SiO$_2$ | 68–75% |
| B$_2$O$_3$ | 12–13% |
| Al$_2$O$_3$ | 5–7% |
| Na$_2$O | 6–7% |
| K$_2$O | 1–2% |
| BaO | 2–3% |
| CaO | 0–1% | wherein the percentages are expressed as percentages by weight of the total glass sheet.

8. The glass sheet of claim 1, wherein said alkaline ion content is less than 50 ppm to a depth of at least 0.2 μm.

9. The glass sheet of claim 1, wherein the amount of said sodium oxide released from said glass sheet after a dwell time of 24 hours in a demineralized water at 96° C. is less than or equal to 0.01 μg/cm$^2$.

10. The glass sheet of claim 9, wherein said glass sheet acts as a substrate upon which are deposited conducting films for the production of flat screens of the "liquid crystal display" type or screens of the electroluminescence type.

11. The glass sheet of claim 9, wherein said glass sheet acts as a substrate upon which is deposited a fine network of diodes or transistors or metal/insulator/metal structure forming flat screens of the "active matrix liquid crystal display" type.

12. A process for deionizing the surface of a low alkaline oxide and alkaline-earth oxide content borosilicate glass sheet comprising:

applying a corona discharge created by the effect of an electric field applied between two electrodes to said glass sheet with a coefficient of thermal expansion of between 30 and 50×10$^7$ K$^{-1}$ wherein the sum of the alkaline oxides and alkaline-earth oxides is less than or equal to 15% by weight of the total glass sheet;

the sodium oxide content is less than or equal to 10% by weight of the total glass sheet;

the boron oxide content is not less than 5% by weight of the total glass sheet; and said surface has an alkaline ion content less than or equal to 500 ppm to a depth of at least 0.2 μm.

13. The process of claim 12, wherein said corona discharge is created by the effect of a current applied by means of a voltage-regulated generator between two electrodes.

14. A process according to claim 13, wherein said voltage-regulated generator produces a mean voltage between the electrodes of between 650 and 1,300 V.

15. A process according to claim 14, wherein said process generates a quantity of electricity greater than 20 mC/cm$^2$ and preferably between 20 and 30 mC/cm$^2$.

* * * * *